(12) United States Patent
Gowda (10) Patent No.: US 9,975,379 B1
(45) Date of Patent: May 22, 2018

(54) VEHICLE ALERTS FOR DRIVERS

(71) Applicant: GM GLOBAL TECHNOLOGY OPERATIONS LLC, Detroit, MI (US)

(72) Inventor: Jagadish Narayan Gowda, Bangalore (IN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days. days.

(21) Appl. No.: 15/356,339

(22) Filed: Nov. 18, 2016

(51) Int. Cl.
*B60Q 9/00* (2006.01)
*B60C 9/00* (2006.01)

(52) U.S. Cl.
CPC ..................... *B60C 9/00* (2013.01)

(58) Field of Classification Search
CPC ................... B60Q 9/00; B60Q 9/001
USPC ....................................... 340/457
See application file for complete search history.

(56) References Cited

U.S. PATENT DOCUMENTS

| | | | | |
|---|---|---|---|---|
| 2011/0224864 A1* | 9/2011 | Gellatly | ............. | G01C 21/3679 |
| | | | | 701/29.5 |
| 2013/0293363 A1* | 11/2013 | Plymouth | ............. | G06Q 20/42 |
| | | | | 340/309.16 |
| 2015/0191122 A1* | 7/2015 | Roy | ..................... | G08G 1/0962 |
| | | | | 340/439 |

* cited by examiner

*Primary Examiner* — Brian Wilson
(74) *Attorney, Agent, or Firm* — Lorenz & Kopf, LLP (57) ABSTRACT

Methods and systems for providing vehicle alerts for drivers are provided. In accordance with one embodiment, a system includes instructions are provided via a processor for an initial notification of an alert to a driver of a vehicle pertaining to information, caution, maintenance, or repair for the vehicle. A user interface device receives an initial acknowledgment of the alert from the driver. The processor provides instructions for a subsequent notification of the acknowledged alert to the driver following the acknowledgment.

18 Claims, 3 Drawing Sheets

VEHICLE ALERTS FOR DRIVERS

TECHNICAL FIELD

The present disclosure generally relates to vehicles, and more particularly relates to methods and systems for providing alerts to drivers of vehicles.

BACKGROUND

Today's vehicles, such as automobiles, may provide certain types of alerts to drivers of the vehicles, for example pertaining to information, caution, maintenance, or repairs that may be needed. While such alerts are often helpful, it may be desirable to provide improved alerts for the driver under certain conditions.

Accordingly, it is desirable to provide improved techniques for providing alerts for drivers of vehicles. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises providing, via instructions provided by a processor, an initial notification of an alert to a driver of a vehicle pertaining to information, caution, maintenance, or repair for the vehicle; receiving, via a sensor, an initial acknowledgment of the alert from the driver; and providing, via instructions provided by the processor, a subsequent notification of the acknowledged alert to the driver following the acknowledgment.

In accordance with another exemplary embodiment, a system is provided. The system comprises a processor and a user interface device. The processor is configured to at least facilitate providing instructions for an initial notification of an alert to a driver of a vehicle pertaining to information, caution, maintenance, or repair for the vehicle. The user interface device is configured to at least facilitate receiving an initial acknowledgment of the alert from the driver. The processor is further configured to at least facilitate providing instructions for a subsequent notification of the acknowledged alert to the driver following the acknowledgment.

In accordance with a further exemplary embodiment, a vehicle is provided. The vehicle comprises a plurality of vehicle components and an alert system. The alert system comprises a processor and a user interface device. The processor is configured to at least facilitate providing instructions for an initial notification of an alert to a driver of a vehicle pertaining to information, caution, maintenance, or repair for one or more of the vehicle components. The user interface device is configured to at least facilitate receiving an initial acknowledgment of the alert from the driver. The processor is further configured to at least facilitate providing instructions for a subsequent notification of the acknowledged alert to the driver following the acknowledgment on different states of vehicle power mode.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
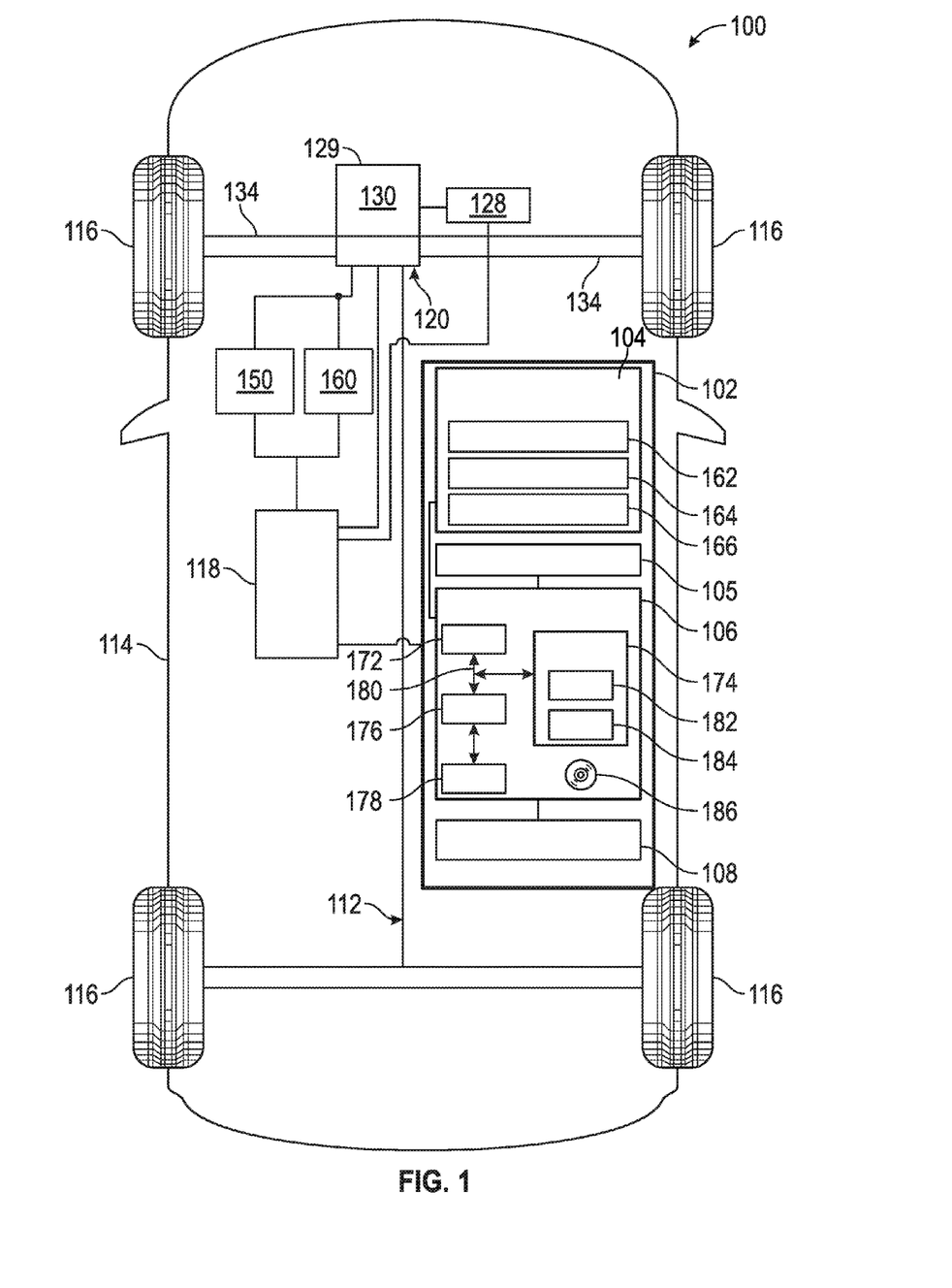
FIG. 1 is a functional block diagram of a vehicle that includes an alert system for providing alerts for a driver of the vehicle, in accordance with an exemplary embodiment.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). In addition, in certain embodiments, the vehicle 100 may comprise any one of a number of other types of vehicles.

As described in greater detail further below, the vehicle 100 includes an alert system 102 for providing alerts for a driver of the vehicle 100. Specifically, as discussed further below, the alert system 102 provides initial notifications of alerts when a component of the vehicle 100 requires information, caution, maintenance, or repair, obtains driver responses to the initial alerts, and provides subsequent notifications pertaining to the alerts in response to the driver responses. In the depicted embodiment, the alert system 102 includes a sensor array 104, a transceiver 105, a controller 106, and a display 108. In various embodiments, the alert system 102 performs various steps as set forth further below in connection with the process 200 of FIGS. 2 and 3.

As depicted in FIG. 1, the vehicle 100 includes, in addition to the above-referenced alert system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. In one the depicted embodiment, the actuator assembly 120 includes an engine and/or motor 130. In one embodiment, the motor/engine 130 comprises an electric motor/generator that is powered by a rechargeable energy storage system (RESS) 128 (e.g., a vehicle battery). In another embodiment, the motor/engine 130 comprises a gasoline combustion engine. In other embodiments, the motor/engine 130 may include one or more other of these and/or other types of engines and/or motors. In certain embodiments, the electronic control system 118 comprises a motor/engine alert system that controls the motor/engine 130 and/or one or more other systems of the vehicle 100.

Still referring to FIG. 1, the motor/engine 130 is coupled to at least some of the wheels 116 through one or more drive shafts 134. In some embodiments, the motor/engine 130 is mechanically coupled to the transmission. In other embodiments, the motor/engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In the depicted embodiment, the steering system 150 includes a steering wheel and a steering column (not depicted). In certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental alert systems, lighting units, navigation systems, and the like (also not depicted). Similar to the discussion above regarding possible variations for the vehicle 100, in certain embodiments steering, braking, and/or acceleration can be commanded by a computer instead of by a driver.

In one embodiment, the alert system 102 is mounted on the chassis 112. The alert system 102 obtains information from various components of the vehicle 100 (e.g. including the wheels 116, electronic control system 118, RESS 128, actuator assembly 120, propulsion system 129, motor/engine 130, steering system 150, braking system 160, and/or one or more other vehicle systems, sub-systems, devices, and/or other components—collectively referred to as vehicle "components"), and provides various alerts for the driver pertaining to such vehicle components. For example, as noted above and also as described in greater detail below, the alert system 102 provides initial notifications of alerts when a component of the vehicle 100 requires information, caution, maintenance, or repair, obtains driver responses to the initial alerts, and provides subsequent notifications pertaining to the alerts in response to the driver responses, in accordance with the steps of the process 200 of FIGS. 2 and 3. Also as noted above and depicted in FIG. 1, in one embodiment the alert system 102 comprises a sensor array 104, a transceiver 105, a controller 106, and a display 108.

The sensor array 104 includes various sensors (also referred to herein as sensor units and/or detection units) that are used for receiving inputs from a driver of the vehicle 100 and for monitoring certain components of the vehicle 100. In the depicted embodiment, the sensor array 104 includes one or more user interface sensors 162, drive cycle sensors 164, and component sensors 166.

The user interface sensors 162 obtain inputs from the driver regarding a user's responses to alerts provided via the alert system 102. In various embodiments, the user interface sensors 162 may comprise one or more sensors associated with user interfaces such as vehicle touch screens, rotary knobs, buttons, and/or other types of user interfaces within the vehicle 100 for receiving inputs from the driver. Alternately, in certain embodiments, some or all of the user inputs may be received instead via the transceiver 105 (e.g. via transmissions from the driver's mobile phone and/or other electronic devices), discussed further below.

The drive cycle sensors 164 receive data as to whether a current drive cycle (e.g. a current ignition cycle) for the vehicle 100 is beginning and/or ending. In one embodiment, the drive cycle sensors 164 comprise one or more vehicle ignition sensors that obtain data as to whether a request to turn off the vehicle ignition has been made (e.g. by the driver turning the keys for the vehicle ignition, pressing a stop button, and/or engaging a keyfob).

The component sensors 166 obtain data pertaining to various components of the vehicle 100, including data as to whether various vehicle components require, or are about to require, information, caution, maintenance, or repair. In certain embodiments, the component sensors 166 obtain such data, directly, or indirectly, from vehicle components such as the wheels 116, electronic control system 118, RESS 128, actuator assembly 120, propulsion system 129, motor/engine 130, steering system 150, braking system 160, and/or one or more other vehicle systems, sub-systems, devices, and/or other components. Also in certain embodiments, the component sensors 166 may be part of such vehicle components, and/or may be part of control systems for such components (e.g. the ECS 118). In various embodiments, the alert system 102 may provide notifications of required information, caution, maintenance, or repair for vehicle components directly from such vehicle components or other control systems.

In various embodiments, the sensor array 104 provides the detected information to the controller 106 (e.g. the processor 172 thereof) for processing, for example as set forth in greater detail below. Also in various embodiments, the sensor array 104 performs these and other functions in accordance with the steps of the process 200 described further below in connection with FIGS. 2 and 3.

The transceiver 105 transmits and/or receives various information for the alert system 102. In various embodiments, the transceiver 105 transmits various alerts (including initial and subsequent notifications pertaining thereto) to the driver of the vehicle 100, for example via an in-vehicle display and/or via electronic transmission for the driver, for example via text messages and/or e-mails sent to mobile phones and/or other electronic devices of the driver. In certain embodiments, the transceiver 105 also receives inputs from the driver, for example including the driver's responses to alert notifications. In addition, in certain embodiments, the transceiver 105 also communicates with one or more vehicle components (such as those listed above) with respect to any information, caution, maintenance, or repair is required for such vehicle components. In various embodiments, the sensor array 104 performs these and other functions in accordance with the steps of the process 200 described further below in connection with FIGS. 2 and 3.

The controller 106 is coupled to the sensor array 104, the transceiver 105, and the display 108. The controller 106 utilizes the various inputs and data provided via the sensor array 104 and/or the transceiver 105, and providers various notifications (including initial and subsequent notifications), via instructions provided to the transceiver 105 and/or the display 108, pertaining to alerts for the driver, including as to whether vehicle components require information, caution, maintenance, or repair. In various embodiments, the controller 106, along with the sensor array 104, the transceiver 105, and the display 108, provide these and other functions in accordance with the steps discussed further below in connection with the schematic drawings of the vehicle 100 in FIG. 1 and the flowcharts and schematic drawings pertaining to the process 200 in FIGS. 2 and 3, discussed further below.

As depicted in FIG. 1, the controller 106 comprises a computer system. In certain embodiments, the controller 106 may also include one or more of the sensors of the sensor array 104, one or more other devices and/or systems, and/or components thereof. In addition, it will be appreciated that the controller 106 may otherwise differ from the embodiment depicted in FIG. 1. For example, the controller 106 may be coupled to or may otherwise utilize one or more remote computer systems and/or other control systems, such as the wheels 116, electronic control system 118, RESS 128, propulsion system 129, motor/engine 130, steering system 150, and/or braking system 160 of FIG. 1, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 106 and the computer system of the controller 106, generally in executing the processes described herein, such as the process 200 described further below in connection with FIGS. 2 and 3.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184.

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensor array 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 200 (and any sub-processes thereof) described further below in connection with FIGS. 2 and 3. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other control systems.

The display 108 is coupled to the controller 106, and provides notifications for the driver of the vehicle 100. Specifically, the display 108 provides notifications, for the driver and/or other occupants of the vehicle 100, as to alerts pertaining to information, caution, maintenance, or repair required for various components of the vehicle 100 (including initial notifications and subsequent notifications, as noted above, and also as described in greater detail further below). In certain embodiments, the display 108 provides these notifications via a visual display screen within the vehicle 100. In other embodiments, the display 108 provides these notifications via an audio message within the vehicle 100. In certain embodiments, the display 108 may provide visual and audio notifications, and/or one or more other types of notifications (e.g. haptic notifications, e-mail, text, or other notifications sent to a user's mobile phone or other electronic device, and/or any number of other different types of notifications). Also in various embodiments, the display 108 performs these and other functions in accordance with the steps of the process 200 described further below in connection with FIGS. 2 and 3.

While the components of the alert system 102 (including the sensor array 104, transceiver 105, the controller 106, and the display 108) are depicted as being part of the same system, it will be appreciated that in certain embodiments these features may comprise two or more systems. In addition, in various embodiments the alert system 102 may comprise all or part of, and/or may be coupled to, various other vehicle devices and systems, such as, among others, the actuator assembly 120 (e.g. the propulsion system 129 and/or the motor/engine 130), the RESS 128, the electronic control system 118, the steering system 150, the braking system 160, and/or one or more other systems of the vehicle 100.

Figure 2:
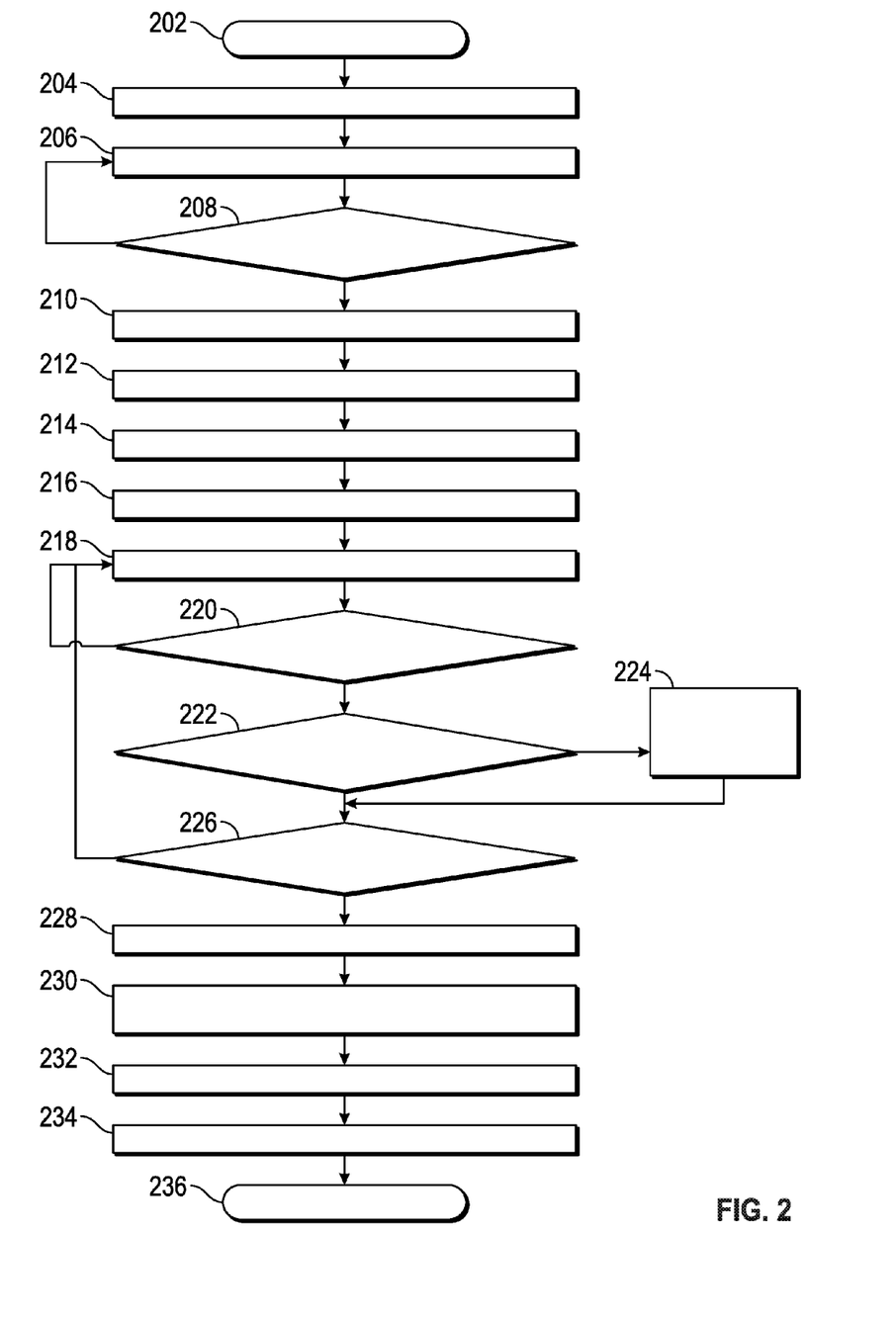
FIG. 2 is a flowchart of a process for providing alerts for a driver of a vehicle, and that can be used in connection with the vehicle and the alert system of FIG. 1, in accordance with an exemplary embodiment.

FIG. 2 is a flowchart of a process 200 for providing alerts for a driver of a vehicle, in accordance with an exemplary embodiment. The process 200 can be implemented in connection with the vehicle 100, including the alert system 102 and other systems, sub-systems, and components thereof of FIG. 1, in accordance with an exemplary embodiment. The process 200 is also discussed below in connection with FIG. 300, which depicts illustrative vehicle displays associated with the process 200, in accordance with an exemplary embodiment.

As depicted in FIG. 2, the process 200 is initiated at step 202. For example, in various embodiments, the process 200 may be initiated when the vehicle 100 starts in a driving mode. In one embodiment, the process 200 is initiated when a driver has engaged an ignition of the vehicle 100 (e.g. by turning a key of the ignition, pressing a start button, and/or engaging a keyfob, e.g. as detected via one or more drive cycle sensors 164 of FIG. 1). In one embodiment, the process 200 continues throughout the ignition cycle or vehicle drive.

One or more alert types are identified (step 204). In one embodiment, a determination is made regarding one or more alert times that the driver or user wishes to monitor, and/or for which the driver or user requires or requests notification. In various embodiments, such determination is made via the processor 172 of FIG. 1, for example in accordance with inputs or requests made by the driver or user, for example prior to the current drive cycle. In various embodiments, notations are made as to the driver's elections with respect to each alert type (e.g., information, action required and service types). For example, in certain embodiments, notations are provided with respect to the driver's elections, for each alert, as to (i) whether the driver wishes to receive further notifications; and, if so, (ii) the timing of such further notifications (e.g., a snooze or timer feature); and (iii) the means of deliver of such further notifications (e.g. via in vehicle display screen, text message, e-mail, and so on). In addition, in certain embodiments, the various alerts are categorized based on such features. Also in various embodiments, the determinations, notations, and categorizations of step 204 is made by the processor 172 of FIG. 1, and resulting notations and characterizations are stored in the memory 174 of FIG. 1 as stored values 184 therein.

Data is monitored with respect to various vehicle components (step 206). In one embodiment, data is monitored with respect to various vehicle components such as the wheels 116, electronic control system 118, RESS 128, actuator assembly 120, propulsion system 129, motor/engine 130, steering system 150, and/or braking system 160 of FIG. 1, and/or one or more other vehicle systems, sub-systems, devices, and/or other components. Also in one embodiment, the data is obtained via one or more sensors of the sensor array 104 of FIG. 1 (and/or as part of respective vehicle components and/or control systems therefor), and provided to the controller 106 of FIG. 1 (specifically, the processor 172 thereof), for example via a vehicle bus (e.g. a CAN bus) and/or via other wired and/or wireless communications (e.g. via the transceiver 105 of FIG. 1).

A determination is made as to whether a condition is present to warrant a driver alert (step 208). In one embodiment, the determination is made by the processor 172 of FIG. 1, based on the data of step 206, as to whether any information, caution, maintenance, or repairs are required for one or more vehicle components. Such maintenance and/or repair, may include, by way of examples only, tire and/or wheel rotation, repair, or replacement, engine coolant and/or idling, power steering service, brake pad service, battery (RESS) service, oil change service, and/or one or more various other actions for any number of components of the vehicle 100. In certain embodiments, such determinations may be made by the actual components themselves, and/or associated components and/or control systems, and such determinations may be provided therefrom to the processor 172 of FIG. 1, e.g. via a vehicle CAN bus and/or in another wired or wireless manner (e.g. via the transceiver 105 of FIG. 1).

If it is determined in step 208 that no alert is warranted, then the process returns to step 206. The data continues to be monitored in various iterations of step 206 until a determination is made that an alert is warranted.

Once it is determined in step 208 that an alert is warranted, then an initial notification is provided with respect to the alert (step 210). In various embodiments, the initial notification includes a message for the driver that a particular action for a particular vehicle component (such as those identified above with respect to step 208, by way of example only) is needed. In various embodiments, the initial notification is provided via instructions provided by the processor 172 of FIG. 1. In certain embodiments, the processor 172 instructs the display 108 of FIG. 1 to provide a visual display with the alert within the vehicle 100 (e.g. on a display screen in a front dash, a front mirror, and/or navigation system of the vehicle 100). In certain other embodiments, the processor 172 instructs the transceiver 105 of FIG. 1 to transmit one or more electric messages (e.g. text message, e-mail) with the alert to a mobile phone or other electronic device of the driver. In addition, in one embodiment, the initial notification of step 210 is provided at the beginning of the drive cycle (e.g. at the beginning of the ignition cycle), or as soon as thereafter that the condition is detected that is warranting the alert.

In certain embodiments, the initial notification also includes language that provides the driver with an opportunity to elect whether or not to receive the subsequent notification for the particular alert (e.g. as to whether the driver wishes to be reminded again in the future regarding the particular event). Also in certain embodiment, the initial notification includes language that provides the driver with an opportunity to set a timer for the subsequent notification for the particular alert (e.g. as part of a "snooze" feature for the particular event, and/or to provide a desired time frame for the next reminder regarding the particular event). In addition, in certain embodiments, the initial notification also includes language that provides the driver with an opportunity to elect a means for receiving the subsequent notification for the particular event (e.g., on a display screen of the vehicle, an e-mail sent and/or text message sent to a mobile phone and/or other electronic device of the driver).

One or more driver responses are obtained (step 212). In various embodiments, a driver response includes a driver's acknowledgement as to the particular alert. In addition, in certain embodiments, driver responses also include a driver's elections from the initial notification, for example as to whether or not to receive the subsequent notification for the particular alert (e.g. as to whether the driver wishes to be reminded again in the future regarding the particular event), an election as to a timer for the subsequent notification for the particular alert (e.g. as part of a "snooze" feature for the particular event, and/or to provide an election of a desired time frame for the next reminder regarding the particular event), and/or to provide an election as to a means for receiving the subsequent notification for the particular event (e.g., on a display screen of the vehicle, an e-mail sent to the driver, and/or a text message sent to a mobile phone of the driver).

In various embodiments, the driver responses of step 212 are detected via one or more user interface sensors 162 of FIG. 1 (e.g. that detect a driver's inputs on one or more user interfaces such as a display screen, rotary knob, button, and/or other user interfaces). In various other embodiments, the driver responses of step 212 are received via the transceiver 105 of FIG. 1, for example from one or more transmissions and/or messages from a mobile phone or other electronic device of the driver of the vehicle 100.

The process determines various options based on the responses (step 214). In one embodiment, the processor 172 of FIG. 1 assesses various options for proceeding with implementing the driver instructions.

The driver responses are implemented (step 216). For example, in various embodiments notations are made as to which alerts type (e.g., information, action required and service types) have been acknowledged by the driver. In addition, in various embodiments, notations are made as to the driver's elections with respect to each alert type (e.g., information, action required and service types). For example, in certain embodiments, notations are provided with respect to the driver's elections, for each alert, as to (i) whether the driver wishes to receive further notifications; and, if so, (ii) the timing of such further notifications (e.g., a snooze or timer feature); and (iii) the means of deliver of such further notifications (e.g. via in vehicle display screen, text message, e-mail, and so on). Also in various embodiments, the determinations and notations of step 216 are made by the processor 172 of FIG. 1, and resulting notations and characterizations are stored in the memory 174 of FIG. 1 as stored values 184 therein.

The current drive cycle is monitored, and a timer is run (step 218). In various embodiments, one or more drive cycle sensors 164 of FIG. 1 are utilized to monitor whether a current vehicle drive cycle (e.g. a current ignition cycle) is about to end, for example by the driver turning the keys for the vehicle ignition, pressing a stop button, and/or engaging a keyfob. In other embodiments, a timer is continually monitored with respect to a desired time for a supplemental notification with respect to the various alerts of step 210 (e.g. either a default time period for a subsequent notification and/or a timer as elected by the user in step 212 with respect to a driver's desired timing for a subsequent notification).

A determination is made as to whether the timer of step 218 has expired (step 220). In one embodiment, this determination is made by the processor 172 of FIG. 1. If it is determined that the processor has not expired, then the process continues performing step 218 until it is has been determined that the timer has expired. Once it is determined that the timer has expired, the process proceeds to step 222, described directly below.

A determination is made as to whether a subsequent notification is warranted for each particular alert (step 222). In one embodiment, this comprises a determination as to whether the driver is set for a reminder as to the particular alert. In various embodiments, this determination is made by the processor 172 of FIG. 1. In certain embodiments, this determination is made for each of the alerts of steps 208 and 210. In certain other embodiments, this determination is made only for the alerts that have been acknowledged in step 212. Also in various embodiments, a subsequent notification is warranted if it is determined that the current vehicle drive cycle (e.g. a current ignition cycle) is about to end, for example by the driver turning the keys for the vehicle ignition, pressing a stop button, and/or engaging a keyfob. In other embodiments, a subsequent notification is warranted if the timer is reached the time at which the subsequent notification is called for (e.g. either a default time period for a subsequent notification and/or a timer as elected by the user in step 212 with respect to a driver's desired timing for a subsequent notification).

If it is determined in an iteration of step 222 that a subsequent notification is warranted, then such subsequent notification(s) are provided (step 224). In various embodiments, the subsequent notifications are provided during the same vehicle drive cycle (e.g. the same ignition cycle) as the initial notifications of step 210.

In certain embodiments, the subsequent notifications are provided at or near the end of the current vehicle drive cycle (e.g. the current ignition cycle), for example when the driver turns the keys for the vehicle ignition, presses a stop button, and/or engages a keyfob. In other embodiments, the subsequent notification is provided when the timer has reached the time at which the subsequent notification is called for (e.g. either a default time period for a subsequent notification and/or a timer as elected by the user in step 212 with respect to a driver's desired timing for a subsequent notification).

In certain embodiments, a subsequent notification is provided for each of the alerts of steps 208 and 210. In certain other embodiments, a subsequent notification is provided only for the alerts that have been acknowledged in step 212. In yet other embodiments, a subsequent notification is provided only for the acknowledged alerts for which the driver has elected to receive subsequent notifications. In still other embodiments, a subsequent notification is provided for each of the alerts, except those for which the driver has opted out of receiving subsequent notifications.

In various embodiments, the subsequent notifications are provided via instructions provided by the processor 172 of FIG. 1. In certain embodiments, the processor 172 instructs the display 108 of FIG. 1 to provide a visual display with the alert within the vehicle 100 (e.g. on a display screen in a front dash, a front mirror, and/or navigation system of the vehicle 100). In certain other embodiments, the processor 172 instructs the transceiver 105 of FIG. 1 to transmit one or more electric messages (e.g. text message, e-mail) with the alert to a mobile phone or other electronic device of the driver. In various embodiments, the means of providing the subsequent notification of step 224 is in accordance with any elections made by the driver in step 212 with respect to the desired means of providing of the supplemental notifications.

In certain embodiment, the subsequent notifications of step 224 also include language for the driver to acknowledge the subsequent notifications, and/or for the driver's elections with respect thereto (e.g. as to whether to receive additional subsequent notifications, with respect to a timer for such additional subsequent notifications, and with respect to a means for providing such additional subsequent notifications, similar to the discussion above with respect to step 210). Also in certain embodiments, the driver is provided the opportunity to scroll through the various supplemental responses of step 224.

Following step 224, the process proceeds to step 226, discussed below.

With reference again to step 222 of FIG. 2, if it is determined in step 222 that a subsequent notification is not warranted, then the process proceeds directly from step 222 to step 226, without providing a subsequent notification of step 224.

During step 226, a determination is made as to whether a vehicle ignition is off. In one embodiment, this determination is made by the processor 172 of FIG. 1 using information provided by one or more of the drive cycle sensors 164 of FIG. 1. If it is determined that the ignition is not off, then the process returns to step 218, and steps 218-226 repeat until there is a determination in an iteration of step 226 that the ignition is off. Once it is determined that the ignition is off, the process proceeds to step 228, described below.

During step 228, a notification is provided indicated that there are alerts that need to be reviewed. In certain embodiments, the notifications of step 228 are provided via instructions provided by the processor 172 of FIG. 1. In certain embodiments, the processor 172 instructs the display 108 of FIG. 1 to provide a visual display with this notification (e.g. on a display screen in a front dash, a front mirror, and/or navigation system of the vehicle 100). In certain other embodiments, the processor 172 instructs the transceiver 105 of FIG. 1 to transmit one or more electric messages (e.g. text message, e-mail) with this notification to a mobile phone or other electronic device of the driver. In various embodiments, the means of providing the subsequent notification of step 228 is in accordance with any elections made by the driver, for example in step 204 and/or step 212.

In addition, in various embodiments, options are provided for the driver as to one or more methods of delivery of the notifications (step 230). In certain embodiments, the providing of the options of step 230 is made as part of, or in conjunction with, the notification of step 228. However, in certain other embodiments, the providing of the options of step 230 may be made as part of one or more separate notices and/or transmissions.

In one embodiment, the process 200 continues as the driver's responses are then received (step 232) and implemented (step 234), similar to the discussion above with respect to steps 212 and 216, respectively. Additionally, in one embodiment, provided that the drier has requested that the current drive cycle (e.g. ignition cycle), the current drive cycle is ended accordingly (step 236) (e.g. with the ignition turned off, accordingly).

Figure 3:
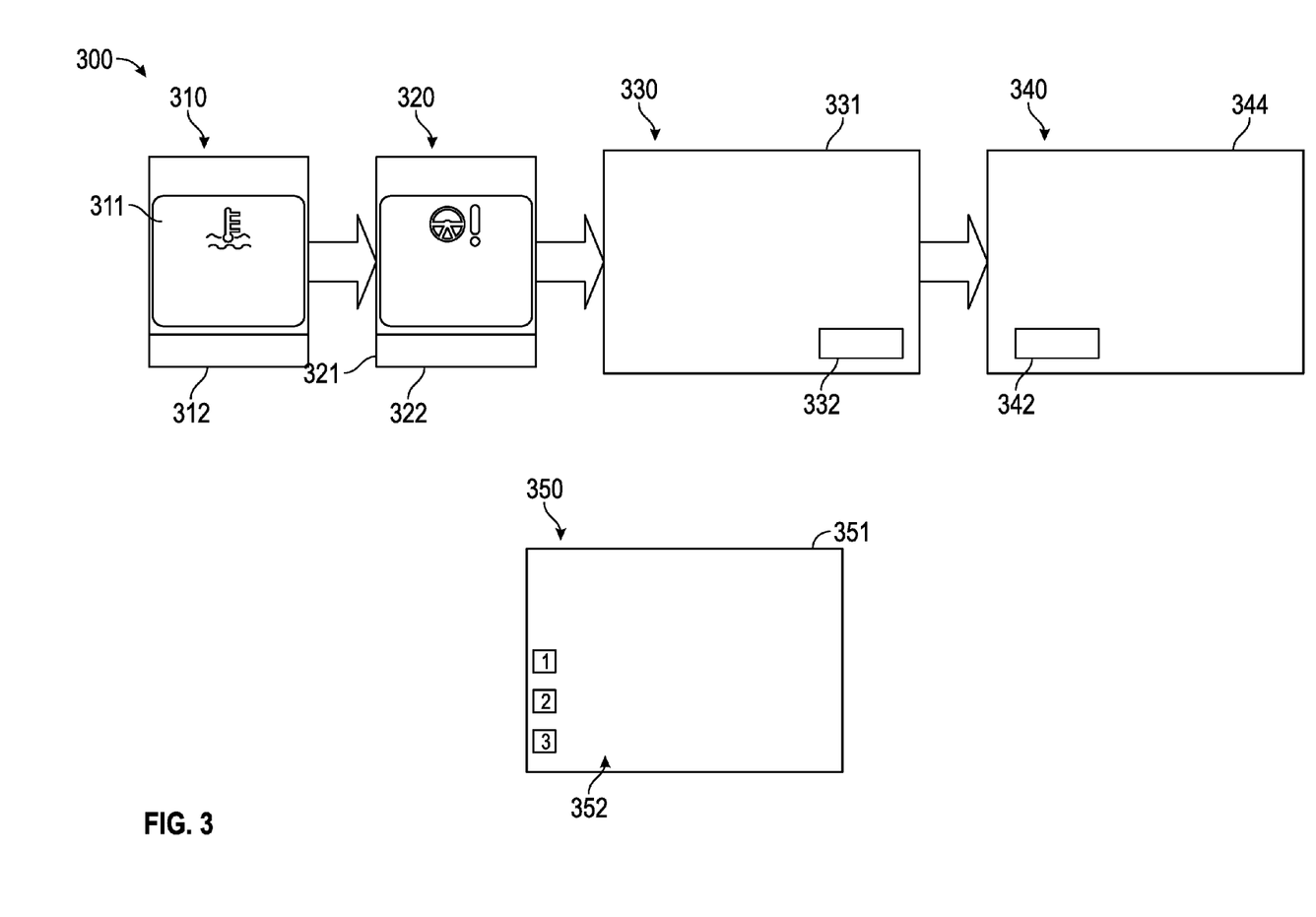
FIG. 3 is an illustration of a driver display that can be used in connection with the process of FIG. 2, in accordance with an exemplary embodiment.

With reference to FIG. 3, an illustration of exemplary driver display screens 300, 350 that can be used for providing the notifications of steps 210 and 224, respectively, of the process 200 of FIG. 2, in accordance with an exemplary embodiment. In one embodiment, the driver display screens 300, 350 may be part of the display 108 of FIG. 1, and receive instructions from the processor 172 of FIG. 1. In other embodiments, the display screens 300, 350 are sent to a user's electronic device by the transceiver 105 of FIG. 1, for example via text message and/or e-mail.

In the example of FIG. 3, display screen 300 includes a sequence of displays 310-340 for exemplary initial notifications of step 210 of FIG. 2.

Specifically, in the depicted example, a first display 310 represents an initial notification (corresponding to step 210 of FIG. 2) pertaining to a first condition (e.g. an engine overheating condition requiring an idling of an engine). The first display 310 includes a description 311 of the condition (i.e. engine overheating, requiring an idling of the engine), along with an opportunity 312 to acknowledge the condition.

The second display 320 represents an initial notification (corresponding to step 210 of FIG. 2) pertaining to a second condition (e.g. a steering system condition requiring power steering service, and in the meantime requiring the driver to drive the vehicle 100 with extra care). The second display 320 includes a description 321 of the condition (i.e. a steering system condition requiring power steering service, and in the meantime requiring the driver to drive the vehicle 100 with extra care), along with an opportunity 322 to acknowledge the condition.

The third display 330 provides another description 331 of one or both of the conditions of displays 310 and/or 320, and also provides the driver with an opportunity 332 to elect whether or not to receive further notifications for one or both of these conditions (also corresponding to step 210 of FIG. 2).

The fourth display 340 provides another description 341 of one or both of the conditions of displays 310 and/or 320, and also provides the driver with an opportunity 342 to elect a time frame (e.g. in hours and/or minutes, for example for a timer and/or snooze feature) for receiving the subsequent notifications for the particular alerts (also corresponding to step 210 of FIG. 2).

With further reference to FIG. 3, display screen 350 represents an exemplary display associated with a subsequent notification of step 224 of the process 200 of FIG. 2, in accordance with an exemplary embodiment. Specifically on Drive Cycle, in accordance with one example, second display screen 350 provides a summary 351 of the alerts for the driver to view, along with a further option 352 for the driver to elect the means by which the subsequent notifications for these alerts are to provided (e.g. via the in vehicle display screen, transmission via text message, and/or transmission via e-mail). It will be appreciated that the display screens 300, 350 of FIG. 3 may vary in other embodiments.

Accordingly, methods, systems, and vehicles are provided for providing alerts for drivers of a vehicle. The disclosed methods, systems, and vehicle provide initial notifications of alerts pertaining to required information, caution, maintenance, or repair for vehicle components, receive user responses to the initial alerts, and provided subsequent notifications pertaining to the alerts in response to the driver responses.

It will be appreciated that the disclosed methods, systems, and vehicles may vary from those depicted in the Figures and described herein. For example, the vehicle 100, the alert system 102, and/or various components thereof may vary from that depicted in FIG. 1 and described in connection therewith. In addition, it will be appreciated that certain steps and/or implementations of the process 200 may vary from those depicted in FIGS. 2 and 3 and/or described above in connection therewith. It will similarly be appreciated that certain steps of the methods described above may occur simultaneously or in a different order than that depicted in FIGS. 2 and 3 and/or described above in connection therewith, and that the displays may differ from those depicted in FIG. 3, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
providing, via instructions provided by a processor, an initial notification of an alert to a driver of a vehicle pertaining to information, caution, maintenance, or repair for the vehicle;
receiving an initial acknowledgment of the alert from the driver via a user interface device;
determining whether an ignition of the vehicle has been turned off; and
providing, via instructions provided by the processor, a subsequent notification of the initially acknowledged alert to the driver depending on a drive cycle and driver option settings following the initial acknowledgment, wherein the subsequent notification is provided after the ignition of the vehicle has been turned off;
wherein:
the initial notification is provided in an ignition cycle, and
the subsequent notification is provided after a request to turn off the vehicle ignition has been made and prior to a termination of the ignition cycle.

2. The method of claim 1, wherein the subsequent notification is provided in a subsequent drive cycle.

3. The method of claim 1, wherein:
the step of providing the initial notification further comprises providing the driver with an opportunity to set a timer for the subsequent notification.

4. The method of claim 1, wherein:
the step of providing the initial notification further comprises providing the driver with an opportunity to elect whether or not to receive the subsequent notification; and
the step of providing the subsequent notification comprises providing the subsequent notification provided that the driver has elected to receive the subsequent notification.

5. The method of claim 1, wherein:
the step of providing the initial notification further comprises providing the driver with an opportunity to elect a means for receiving the subsequent notification, the means selected from a display on a display screen of the vehicle, an e-mail sent to the driver, and a text message sent to a mobile phone of the driver; and
the step of providing the subsequent notification comprises providing the subsequent notification via the means elected by the driver.

6. The method of claim 1, wherein:
the step of providing the subsequent notification comprises providing the subsequent notification via a text message or e-mail message to a mobile phone of the driver.

7. The method of claim 1, further comprising:
detecting, via one or more drive cycle sensors, whether the driver turns keys off for the ignition, presses a stop button to turn the ignition off, or engages a keyfob to turn the ignition off;
determining whether the driver has taken an action to turn off the ignition of the vehicle based on whether the driver has turned keys off for the ignition, pressed the stop button to turn the ignition off, or engaged the keyfob to turn the ignition off; and
providing instructions for the subsequent notification after the driver has taken the action to turn off the ignition of the vehicle by turning keys off for the ignition, pressing the stop button to turn the ignition off, or engaging the keyfob to turn the ignition off.

8. A system comprising:
a processor configured to at least facilitate providing instructions for an initial notification of an alert to a driver of a vehicle pertaining to information, caution, maintenance, or repair for the vehicle; and
a user interface device configured to at least facilitate receiving an initial acknowledgment of the alert from the driver;
wherein the processor is further configured to at least facilitate:
determining whether an ignition of the vehicle has been turned off; and
providing instructions for a subsequent notification of the initially acknowledged alert to the driver following the initial acknowledgment, wherein the subsequent notification is provided after the ignition of the vehicle has been turned off; and
wherein:
the initial notification is provided in an ignition cycle, and
the subsequent notification is provided after a request to turn off the vehicle ignition has been made and prior to a termination of the ignition cycle.

9. The system of claim 8, wherein the initial notification and the subsequent notification are both provided during a same vehicle drive cycle.

10. The system of claim 8, wherein:
the initial notification provides the driver with an opportunity to set a timer for the subsequent notification.

11. The system of claim 8, wherein:
the initial notification provides the driver with an opportunity to elect whether or not to receive the subsequent notification; and
the subsequent notification is provided, only if the driver has elected to receive the subsequent notification.

12. The system of claim 8, wherein:
the initial notification provides the driver with an opportunity to elect a means for receiving the subsequent notification, the means selected from a display on a display screen of the vehicle, an e-mail sent to the driver, and a text message sent to a mobile phone of the driver; and
the subsequent notification is provided via the means elected by the driver.

13. The system of claim 8, wherein the subsequent notification is provided via an e-mail message or a text message to a mobile phone of the driver.

14. The system of claim 8 wherein:
the subsequent notification is provided via a display screen of the vehicle.

15. The system of claim 8, further comprising:
one or more drive cycle sensors configured to detect when the driver turns keys off for the ignition, presses a stop button to turn the ignition off, or engages a keyfob to turn the ignition off;
wherein the processor configured to at least facilitate:
determining whether the driver has taken an action to turn off the ignition of the vehicle based on whether the driver has turned keys off for the ignition, pressed the stop button to turn the ignition off, or engaged the keyfob to turn the ignition off; and
providing instructions for the subsequent notification after the driver has taken the action to turn off the ignition of the vehicle by turning keys off for the ignition, pressing the stop button to turn the ignition off, or engaging the keyfob to turn the ignition off.

16. A vehicle comprising:
a plurality of vehicle components; and
an alert system comprising:
   a processor configured to at least facilitate:
      determining whether a driver has taken an action to turn off an ignition of the vehicle; and
      providing instructions for an initial notification of an alert to the driver of the vehicle pertaining to information, caution, maintenance, or repair for one or more of the vehicle components; and
   a user interface device configured to at least facilitate receiving an initial acknowledgment of the alert from the driver;
   wherein the processor is further configured to at least facilitate providing instructions for a subsequent notification of the initially acknowledged alert to the driver following the initial acknowledgment, wherein the subsequent notification is provided after the driver has taken the action to turn off the ignition of the vehicle and before an engine of the vehicle has been turned off.

17. The vehicle of claim 16, wherein:
the initial notification is provided in an ignition cycle, and
the subsequent notification is provided prior to a termination of the ignition cycle.

18. The vehicle of claim 16, wherein:
the alert system comprises one or more drive cycle sensors configured to detect when the driver turns keys off for the ignition, presses a stop button to turn the ignition off, or engages a keyfob to turn the ignition off; and
the processor configured to at least facilitate:
   determining whether the driver has taken the action to turn off the ignition of the vehicle based on whether the driver has turned keys off for the ignition, pressed the stop button to turn the ignition off, or engaged the keyfob to turn the ignition off; and
   providing instructions for the subsequent notification after the driver has taken the action to turn off the ignition of the vehicle by turning keys off for the ignition, pressing the stop button to turn the ignition off, or engaging the keyfob to turn the ignition off.

\* \* \* \* \*